July 17, 1923.

F. W. GROBY

ACCOUNTING SHEET

Filed Nov. 26, 1918

1,461,757

Inventor
Frederick W. Groby
By his Attorney

Patented July 17, 1923.

1,461,757

UNITED STATES PATENT OFFICE.

FREDERICK W. GROBY, OF RIVER EDGE, NEW JERSEY.

ACCOUNTING SHEET.

Application filed November 26, 1918. Serial No. 264,169.

*To all whom it may concern:*

Be it known that I, FREDERICK W. GROBY, residing at River Edge, in the county of Bergen and State of New Jersey, have invented certain new and useful Improvements in Accounting Sheets, of which the following is a specification.

This invention relates to an accounting device and particularly to what is familiarly known to accountants as a safeguard ledger.

The object of the invention is to provide a safeguard ledger sheet of such character that all of the required calculations thereon may be performed by a mechanical typewriting and calculating machine.

A further object is to provide a device, as indicated, and in which daily balances are computed and written so that they are always apparent upon the face of the sheet.

A further object is to provide a sheet, as above, in which blank spaces are provided suitable for "pick-up," onto the calculating machine, certain figures upon which the calculations depend.

A further object is to provide a separate, or detachable, member upon which the figures may be "picked-up" and which may be removed after its usefulness has been exhausted, said separate piece preferably being positioned to overlie some other portion of the sheet while in use.

A further object is to provide a sheet ruled and captioned to indicate the several days of the week, month, or otherwise, and to provide means whereby such a sheet may have all of its figures or calculations written thereon by a mechanical typewriting machine and without the necessity for widening the sheet to provide colums upon which to perform the necessary "picking-up" operations of the typewriting machine.

A further object is to provide a sheet as just referred to and which includes a strip arranged to have the final balances, or figures, of a given sheet written thereon, the strip being detachable and being adapted to be transferred to a subsequent sheet so that the figures thereon may be readily identified with the appropriate spaces upon said subsequent sheet.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings which are to be taken as a part of this specification, and in which I have shown merely a preferred form of embodiment of the invention:

Figure 1 is a plan view of a sheet having its features arranged in accordance with this invention, and Figure 2 is a similar view of a portion of Fig. 1, but illustrating a modification in which the detachable "pick-up" strips of Fig. 1 are displaced by a permanently provided column.

For illustration the sheet shown is such as would be used in a bank, or the like, for calculating the various depositors' balance from day to day. It will be apparent, of course, however, that the principles of this invention may be applied to other uses if desired.

Referring to the drawings for describing in detail the structure which is illustrated therein, the reference character L indicates a sheet of paper or the like upon which is ruled a series of horizontal lines spaced apart to define a plurality of numbered spaces as indicated, 1, 2, 3, 4 and 5, Of course the length of the sheet may be increased to include any desired number of spaces.

A series of relatively conspicuous vertical lines, as 11, is provided to divide the sheet horizontally to correspond with the days of the week, the several sections being captioned "Monday," Tuesday," etc. Each section is divided by a vertical line 12 providing colums, one captioned "Debits & credits" and the other captioned "Daily balance." Other vertical lines, as 13 and 14, may be provided if desired, the line 13 providing a column 15 in which brief notation may be written referring to the items adjacent thereto, while the line 14 defines a column 16 in which may be printed the "proof" stars presently explained.

For certain of the sections "detachable pick-up strips" as G are provided. These strips may be separately formed, or otherwise, as found most expedient. For convenience they are illustrated as being separately formed and as being attached to the main sheet by means of glue, or the like, 17 provided at the upper and lower ends of the strip. Any other attaching means may, of course, be employed, the strip being preferably of less length than the full width of the sheet so as to leave a blank space unobstructed extending along the upper edge of the sheet for containing a general heading or other matter.

The "pick-up" strips are provided with horizontal lines 18 arranged as continuations of the lines defining the spaces 1, 2, 3, etc.

As illustrated, the first "pick-up" strip in Fig. 1 is shown to over-lie the "Debits & credits" column of the section "Tuesday".

At the left hand margin of the sheet a vertical column 19 is provided in which the names of the depositors may be written one for each of the sections 1, 2, 3, etc.

To use this sheet: The sheet is placed in the typewriting, or calculating, machine in the usual manner. The names of the depositors are written in the column 19 and the balances from the previous day are written in the column "Daily balance" of the "Monday" section.

In the space numbered 1 in the drawing, the depositor's name is "Anders", and the balance to his credit brought over from Saturday night is $100.00.

This data is written for all the depositors and the sheet removed from the machine.

Subsequently withdrawals are noted and balances struck:

In the space numbered 1 in the drawing, the amount withdrawn, as shown by the shaded figures, is $50. In order that the machine may be made to compute the difference between the balance of $100, and the withdrawal of $50, the amount of the balance is written upon the "pick-up" strip, as at 20, so as to register that amount on the indicator in the machine. The carriage is then shifted and the amount of the withdrawal is printed, preferably in red, in the "Debits & credits" column, as at 21. The printing of the amount of the withdrawal will register in the indicator of the machine, and the indicator will visually show the difference between the withdrawal and the original balance, which difference, in this instance, is $50. The operator thereupon shifts the carriage and writes into the "Daily balance" column the amount, $50. As proof upon the sheet that the amount written as the difference between the original balance and the withdrawal exactly corresponds to the amount shown on the indicator on the machine, the operator may impress a "proof star" 22, it being understood that the machine may comprise suitable mechanism to prevent the impression of the star unless the amount written as the difference between the original balance and the withdrawal corresponds exactly to the amount of such difference as shown visually on the indicator of the machine.

Subsequently, as shown in the drawing, the depositor, Anders, makes a deposit of $400. The operator at the close of business for the day, desiring to compute the depositor's balance for Tuesday, picks up on to the machine the amount of the former balance, $50, by writing said amount upon the "pick-up" strip, as at 23. The operator then shifts the machine and writes the amount $400 in the "Debits & credits" column, as at 24, preferably in black so as to distinguish from a withdrawal. This registers the amount of the deposit on the machine and the indicator of the machine visually shows the sum of $50 and $400, or $450, which the operator thereupon writes into the "Daily balance" column of the section "Tuesday" as at 25, impressing the "proof star", as 26, to show that the writing is in exact accordance with the showing upon the indicator of the machine.

This same process is proceeded with relative to each depositor in the column 19, and it will be apparent that the "pick-up" strip G has been used simply as a convenient medium upon which to impress the figures necessary to cause the indicator of the machine to properly register the different amount upon which the calculations are based. The figures upon the "pick-up" strip are usually of no further use after Monday's work has been completed. Therefore, the "pick-up" strip is removed leaving a clear, or blank, "Debts & credits" column beneath it in the "Tuesday" section. If on Tuesday the depositor Anders makes a withdrawal, then the amount $450 will be picked up on the "pick-up" strip of the section "Wednesday". The amount of the withdrawal will be written into the "Debits & credits" column of the section "Tuesday" and the difference, as shown on the indicator of the machine, will be written in the "Daily balance" column of the section "Tuesday" just beneath the amount $450.

The totals for the various columns may be written in the spaces, as 27, beneath the columns and the "pick-up" operations required for the necessary addition and subtraction calculations may be made upon the "pick-up" strip in the same manner as just described.

In this way it will be seen that the width of the sheet L is maintained at a minimum and yet ample space is provided for the necessary "pick-up" operations.

For the last section at the right of the sheet, as for instance the section "Saturday" shown in the drawing, the "pick-up" operation is performed directly upon the sheet in a column 28 and the "Daily balance" intended to be carried over to the next sheet is preferably written in a special column 29 which is provided upon a portion of the sheet at the extreme right hand edge adapted to be separated from the main portion of the sheet along a perforated line 30. When the sheet is completed the portion bearing the column 29 is detached and is placed temporarily upon the sheet for the subsequent week in a position preferably overlying the "Debits & credits" column of the "Monday" section of said subsequent week. The operator is thereby enabled to quickly and accurately transfer the balances shown in the column 29 to the "Daily balance" column of the section "Monday" of said subsequent week.

It should be noted that the provision of the "pick-up" column 28 directly upon the sheet L does not unnecessarily increase the width of the sheet for the reason that this space is required to carry the binding perforations or the like, as H, by means of which the sheet may be bound into a suitable binder.

The modification Fig. 2 is the same in all respects as the device described in Fig. 1, except that the "pick-up" columns are all provided directly upon the main sheet, as at 31 and 32. A sheet ruled in this manner, while somewhat wider than a sheet in which the detachable "pick-up" strips are used, is nevertheless entirely serviceable for use in connection with a mechanical typewriting and calculating machine, and is, in fact, desirable in many instances, especially where it is desirable to refer back to the figures picked up from time to time, as is often the case in certain lines of business.

It should be mentioned that although the detachable "pick-up" strips of Fig. 1 are shown to be positioned over the "Debits & credits" columns, nevertheless they could, of course, be otherwise positioned according to convenience. For instance, the "pick-up" strip for "Tuesday" section might be placed over the finished "Daily balance" column of the section "Monday" instead of being placed over the blank "Debits & credits" column of the section "Wednesday."

Also, it will be apparent, that more than one "pick-up" strip might be used for each day, in cases where sufficient space cannot be found upon a single strip.

While the strips are primarily intended for use as "pick-up" strips, it will, of course, be obvious that they may be used for other purposes, as for instance, as a sort of scrap space upon which necessary calculations may be performed.

It should also be mentioned that while the drawing illustrates the debits and credits to be located in a single column, being distinguished only by different colored type, nevertheless two separate columns may be provided if desired. In this connection it is pointed out that wherever in the claims a "Debits & credits" column is referred to, said term is intended to include either one or two columns.

As many changes could be made in this construction without departing from the scope of the invention as defined in the following claims, it is intended that all matter contained in the above description or shown in the accompanying drawings, shall be interpreted as illustrative only and not in a limiting sense.

It has been above explained that the "pick-up" strips of Fig. 1 might be connected to the main sheet in any manner. It is intended, in this connection, that the invention shall comprehend the use of a strip which, although not positively connected to the main sheet, could be laid on to the sheet and fed into the typewriting, or like, machine therewith. Such a strip could be of any length, or it could even be supported in the machine as a roll of strip paper similar to the so called "tally rolls" now employed in calculating machines.

Having thus described my invention, what I claim as new and desire to secure by Letters Patent is:—

1. A safe guard ledger sheet comprising a sheet, suitable ruling and captions dividing the sheet into a plurality of sections, means dividing each section into a plurality of columns, said ruling also providing a further column at one side of said sections, said ruling also including a plurality of horizontal lines dividing all of said columns vertically into a plurality of separated spaces, a plurality of detachable "pick-up" strips associated one with each of certain of said sections, said sheet having a binder portion at one side thereof by which the sheet may be bound within a suitable binder, and said ruling defining a "pick-up" column within said binder portion, together with a detachable strip beyond said binder portion, all for use substantially in the manner set forth.

2. An accounting sheet comprising a sheet, suitable ruling dividing the sheet into a plurality of sections, said sheet having a binder portion at one side thereof, and said sheet also having a detachable strip beyond said binder portion.

3. An accounting sheet comprising a sheet, suitable ruling dividing the sheet into a plurality of sections, means dividing each section into a plurality of columns, and a plurality of separate and detachable pick-up strips associated one with each of certain of said sections, arranged to overlie a certain column in each said section substantially as and for the purpose set forth.

4. An accounting sheet comprising a sheet, suitable ruling dividing the sheet into a plurality of sections, and a separate pick-up strip arranged to overlie a part of one of said sections, said strip having gummed portions by which it is connected with the sheet.

5. An accounting sheet comprising a sheet, suitable ruling dividing the sheet into a plurality of sections, a separate strip overlying and positioned to extend vertically of one of said sections from adjacent the upper to adjacent the lower edge of the sheet but being of less length than the height of the sheet, and having gummed portions by which it is attached to the face of the sheet.

6. The herein described method of keeping accounts by the use of a typewriting machine, said machine being of a character such that desirable and undesirable writing must be performed during the operation thereof, and said method consisting in providing a sheet having certain spaces set off to receive different columns of figures and having a detachable pick-up strip overlying one of said spaces upon which the undesirable writing may be performed, performing the desirable writing in one of said columns, meanwhile performing the undesirable writing upon the pick-up strip, and then detaching the pick-up strip to expose the space therebeneath for receiving further desirable writing.

7. The herein described method of keeping accounts by the use of a typewriting machine, said machine being of a character such that desirable and undesirable writing must be performed thereby during the operation thereof, there being employed a sheet and a separate strip overlying a portion of said sheet, and said method consisting in performing the desirable writing upon the portion of said sheet free of said strip meanwhile performing necessary undesirable writing upon said strip thus saving clean the space upon the sheet beneath said strip, and then removing said strip to expose the space therebeneath for receiving further desirable writing.

In testimony whereof I affix my signature in the presence of two witnesses.

FREDERICK W. GROBY.

Witnesses:
L. GESSFORD HANDY,
MAY SCHULZ.